(12) United States Patent
Nakahama

(10) Patent No.: US 9,046,606 B2
(45) Date of Patent: Jun. 2, 2015

(54) RADAR SIGNAL PROCESSING DEVICE AND PROGRAM, AND RADAR APPARATUS

(75) Inventor: Masahiro Nakahama, Sanda (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 415 days.

(21) Appl. No.: 13/413,007

(22) Filed: Mar. 6, 2012

(65) Prior Publication Data

US 2012/0229327 A1  Sep. 13, 2012

(30) Foreign Application Priority Data

Mar. 7, 2011  (JP) ................................ 2011-049157

(51) Int. Cl.
  *G01S 13/08*  (2006.01)
  *G01S 13/93*  (2006.01)
  *G01S 7/10*  (2006.01)
  *G01S 7/292*  (2006.01)
  *G01S 13/42*  (2006.01)

(52) U.S. Cl.
  CPC ............... *G01S 13/9307* (2013.01); *G01S 7/10* (2013.01); *G01S 7/2921* (2013.01); *G01S 13/426* (2013.01)

(58) Field of Classification Search
  CPC ...... G01S 13/426; G01S 13/9307; G01S 7/10; G01S 7/2921
  USPC .................................. 342/118, 146, 147, 175
  See application file for complete search history.

(56) References Cited

U.S. PATENT DOCUMENTS

| 6,373,427 B1 * | 4/2002 | Hohne ........................... 342/128 |
| 7,880,669 B2 * | 2/2011 | Shinagawa et al. ............ 342/147 |
| 2010/0028012 A1 * | 2/2010 | Ng ................................ 398/116 |

FOREIGN PATENT DOCUMENTS

| JP | 10038997 | 2/1998 |
| JP | 2002257926 A | 9/2002 |
| JP | 2006275828 A | 10/2006 |

* cited by examiner

*Primary Examiner* — Timothy A Brainard
(74) *Attorney, Agent, or Firm* — Alleman Hall McCoy Russell & Tuttle LLP

(57) ABSTRACT

This disclosure provides a radar signal processing device, which includes an amplitude value change determiner for determining, among amplitude values of a series of reception data, an increase/decrease tendency of a predetermined number of amplitude values of the reception data, and a filter processor for filtering the reception data based on the determination result.

19 Claims, 8 Drawing Sheets

RADAR SIGNAL PROCESSING DEVICE AND PROGRAM, AND RADAR APPARATUS

CROSS-REFERENCE TO RELATED APPLICATION(S)

The application claims priority under 35 U.S.C. §119 to Japanese Patent Application No. 2011-049157, which was filed on Mar. 7, 2011, the entire disclosure of which is hereby incorporated by reference.

TECHNICAL FIELD

The present invention relates to signal processing of a radar apparatus that is performed on a signal received thereby.

BACKGROUND OF THE INVENTION

Among ship radars, a low priced compact radar, especially such as a radome type radar, has a short antenna length that causes a horizontal beam width to widen, and as a result there has been a problem with low resolution in an azimuth direction. In such case where the resolution in the azimuth direction is low, a target is displayed on a radar screen in a manner of being extended in the azimuth direction more than an appropriately scaled size, therefore, there has been a problem that a visibility of the target on the radar screen degrades; for example, two aligned targets may be superimposed with each other and recognized as one.

Although various methods of improving the azimuth resolution have been proposed, such as using a phased array antenna and a MUSIC algorithm, expensive hardware, such as an antenna, and a complex equipment have been impediments to adoption and, currently, the above methods are difficult to be adopted for low priced compact radar.

Meanwhile, various methods of improving the visibility of the target on the radar screen by improving a method of processing the received signal have also been proposed. For example, JP10-038997A discloses a radar image processing device that allows an easy observation of a radar image by filtering an original signal through a low pass filter to enlarge the radar image. Implementation of such a method of improving the signal processing method can be realized at a lower cost than the method of improving the function of an antenna itself (e.g., the phased array antenna and the MUSIC algorithm), and therefore, it is considered easy to apply to compact and low priced radar.

Meanwhile, the configuration disclosed in JP10-038997A is for enlarging the radar image in the azimuth direction, and therefore cannot solve the problem that the two targets aligned in the azimuth direction are superimposed with each other and perceived as one. Thus, with the configuration disclosed in JP10-038997A, an effect of improving the azimuth resolution of compact radar cannot be expected.

The present invention is made in view of the above situation, and a main object thereof is to provide a radar signal processing device where resolution is improved by simple signal processing, without requiring expensive hardware and a complex system.

SUMMARY OF THE INVENTION

The present invention attempts to solve the above described problems. Means for solving these problems and the effects thereof are described below.

According to one aspect of the invention, a radar signal processing device is provided. The radar signal processing device includes an amplitude value change determiner for determining, among amplitude values of a series of reception data, an increase/decrease tendency of a predetermined number of amplitude values of the reception data, and a filter processor for filtering the reception data based on the determination result.

The radar signal processing device is preferably configured as follows. The radar signal processing device may further include a filter coefficient changer for determining a filter coefficient based on the determination result of the amplitude value change determiner. The filter processor may filter the reception data by using the determined filter coefficient.

By determining the filter coefficient based on the determination result of the amplitude value change determiner, processing in which the filter coefficient is changed, for example, between an area where the amplitude value increases or decreases and other areas (e.g., the area indicating the maximum value of the series of reception data) can be performed. In this manner, the shape of the echo obtained from the reception data can be reshaped as desired, and therefore, the visibility of the echo image in the radar image can be improved. Further, because a complex system is not required, and position and azimuth information obtained from a GPS or a gyrocompass is also not required, the radar signal processing device can be configured easily at low cost.

Thus, by changing the filter coefficient based on the increase/decrease tendency of the amplitude values of the reception data contained in the series of reception data which is the processing target, for example, the effect of the filter can be changed for the respective cases where the series of reception data has an increase tendency, a decrease tendency, or neither of these tendencies (e.g., where the amplitude value of the reception data indicates a maximum or minimum value of the series of reception data).

The radar signal processing device is preferably configured as follows. When the predetermined number of amplitude values indicate neither the increase tendency nor the decrease tendency, the filter coefficient changer may determine the filter coefficient so that the filter processor outputs the amplitude value of the reception data inputted at a central filter tap of an odd number of three or more filter taps of the filter processor, the number of the filter taps corresponding to the predetermined number.

In this manner, the maximum and minimum values of the series of reception data can be prevented from being changed before and after the filtering. Therefore, when the echo obtained from the reception data is displayed in the radar image, problems due to erroneous filtering, such as the failure to properly display an echo image that should have been displayed, or improperly displaying an echo image that should not have been displayed, can be prevented.

The radar signal processing device is preferably configured as follows. When the predetermined number of amplitude values indicate an increase tendency, the filter coefficient changer may determine the filter coefficient so that the filter processor outputs a moving average based on reception data preceding the reception data corresponding to a central filter tap of an odd number of three or more filter taps of the filter processor. When the predetermined number of amplitude values indicate a decrease tendency, the filter coefficient changer may determine the filter coefficient so that the filter processor outputs the moving average based on reception data following the reception data corresponding to the central filter tap.

In this manner, the shape of the echo obtained from the reception data can be formed with fine precision by the filtering. Thus, the echo images of the plurality of adjacent objects are suppressed from being superimposed with each other and the identifiability of the echo image improves.

The radar signal processing device may be configured as follows. When the predetermined number of amplitude values indicate a decrease tendency, the filter coefficient changer may determine the filter coefficient so that the filter processor outputs a moving average based on reception data preceding the reception data corresponding to a central filter tap of an odd number of three or more filter taps of the filter processor. When the predetermined number of amplitude values indicate an increase tendency, the filter coefficient changer may determine the filter coefficient so that the filter processor outputs the moving average based on reception data following the reception data corresponding to the central filter tap.

In this manner, the shape of the echo obtained from the reception data can be enlarged by the filtering.

The series of reception data preferably continues in an azimuth direction.

Thus, the shape of the echo obtained from the reception data can suitably be adjusted in the azimuth direction by filtering the reception data continuous in the azimuth direction. Therefore, the resolution in, for example, the azimuth direction can be improved.

In the radar signal processing device, the filter processor preferably changes the filter coefficient according to a distance from the device to a target object corresponding to the reception data.

In this manner, the shape of the echo obtained from the reception data can suitably be adjusted according to the distance from the radar signal processing device.

The series of reception data may continue in a distance direction.

Thus, the shape of the echo obtained from the reception data can suitably be adjusted in the distance direction by filtering the reception data continuous in the azimuth direction. Therefore, the resolution in, for example, the distance direction can be improved.

The radar signal processing device preferably further includes a filter tap number determiner for determining the number of filter taps of the filter processor based on a usage condition of a radar apparatus.

Thus, the number of the filter taps is changed based on the usage conditions. In this manner, even in the case where the usage condition is changed, the effect of the filtering can be kept consistent.

According to another aspect of the invention, a radar apparatus is provided. The radar apparatus includes the radar signal processing device of the other aspect of the invention, an antenna, and a display for displaying a radar image based on the filtered reception data.

According to the radar apparatus, the radar image can be displayed based on the series of reception data in which the shape of the peak area is adjusted by the filter processor. Therefore, the visibility of the radar image can be improved.

According to another aspect of the invention, a computer executable program for causing a computer to process a radar signal is provided. The program includes causing a computer to determine, among amplitude values of a series of reception data, an increase/decrease tendency of a predetermined number of amplitude values of the reception data, and causing a computer to filter the reception data based on the determination result.

By changing the filter coefficient based on the determination result, the processing in which the filter coefficient is changed, for example, between an area where the amplitude value increases or decreases and other areas (e.g., the area indicating the maximum value of the series of reception data) can be performed. In this manner, the shape of the echo obtained from the reception data can be reshaped as desired, and therefore, the visibility of the echo image in the radar image can be improved.

According to another aspect of the invention, a method of processing a radar signal is provided. The method includes determining, among amplitude values of a series of reception data, an increase/decrease tendency of a predetermined number of amplitude values of the reception data, and filtering the reception data based on the determination result.

By changing the filter coefficient based on the determination result, the processing in which the filter coefficient is changed, for example, between an area where the amplitude value increases or decreases and other areas (e.g., the area indicating the maximum value of the series of reception data) can be performed. In this manner, the shape of the echo obtained from the reception data can be reshaped as desired, and therefore, the visibility of the echo image in the radar image can be improved.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION OF THE EMBODIMENTS

First, an object and effect of an algorithm of a radar signal processing program (hereinafter, this may be referred to as the "radar signal processing algorithm") according to an embodiment of the present invention is briefly explained. The algorithm performs the filtering on a series of reception data so as to improve a resolution of a radar apparatus.

As is well known, a radar apparatus transmits a radio wave from an antenna, receives an echo (reflected wave), and in this manner, detects a peripheral target object. The radar apparatus generates digital reception data by sampling the echo signal received by the antenna.

Figure 1:
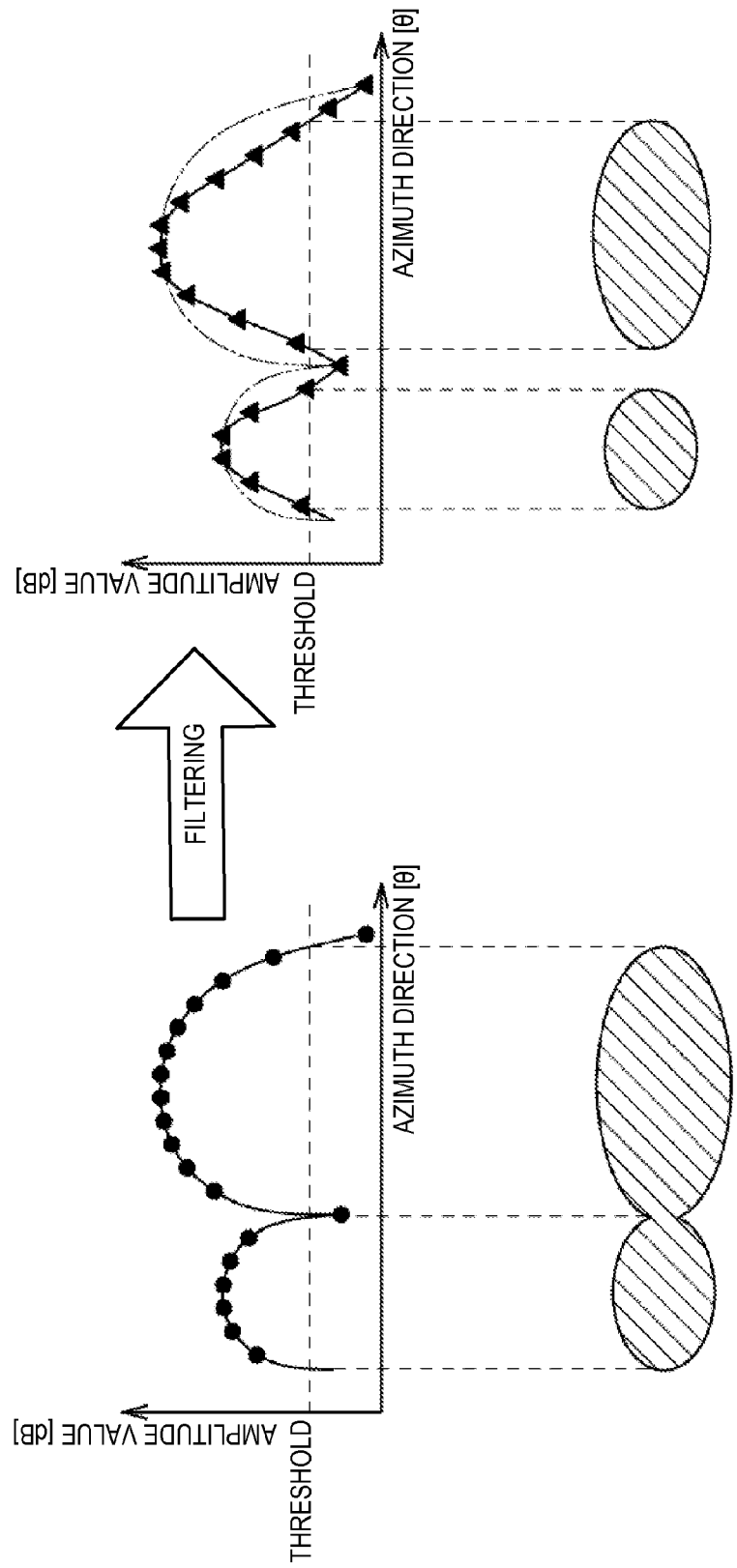
FIG. 1 is charts explaining an effect of filtering by a radar signal processing program according to an embodiment of the invention.

For example, when two objects exist adjacent to each other, as shown in the left chart of FIG. 1, a series of reception data having two peaks is obtained in the radar apparatus. In the charts in FIG. 1, the vertical axis indicates an amplitude value (signal level of the echo) and the lateral axis indicates an azimuth. By plotting the reception data indicating an amplitude value above a predetermined threshold on a radar image, an echo image as shown below the left chart in FIG. 1 can be obtained. Note that, in the charts of FIG. 1, the reception data is newer toward the right.

Here, if the resolution of the radar apparatus is not sufficiently high, as shown below the left chart in FIG. 1, echo images from the two adjacent objects may be displayed on a display so as to appear coupled to each other as one object. In this case, there is a possibility that when an operator of the radar apparatus looks at the echo images displayed on the display, he/she may mistakenly perceive that the echo images are an echo from a single object. Needless to say, the above problem can be solved by improving the resolution by improving a performance of the antenna; however, in this case, problems arise that the expense for hardware becomes high and that the system thereof becomes complex.

Thus, by performing the filtering on the obtained series of reception data (the left chart in FIG. 1), the radar signal processing algorithm of this embodiment narrows a width of a peak area of the series of reception data, as shown in the right chart of FIG. 1. If the width of the peak area can be narrowed as above, as shown below the right chart in FIG. 1, each echo image displayed on the display becomes small and the echo images of the adjacent target objects do not superimpose with each other, therefore, a plurality of adjacent echo images can clearly be distinguished on the display.

Here, it is important that a maximum value (at the peak) and a minimum value in the chart of the series of reception data are not changed before and after the filtering. That is, if the maximum value and the minimum value are changed by filtering, the echo image that should be displayed may be excluded from the radar image, or an echo image that should not be displayed (e.g., noise) may appear in the radar image. Therefore, it is important to narrow only the width of the peak area without changing the maximum value (at the peak) and the minimum value in the chart of the series of reception data.

Next, the radar signal processing algorithm of this embodiment is explained in detail.

As described above, the radar signal processing algorithm is for performing the filtering on the series of reception data. The filter here is configured as a finite impulse response (FIR) filter. Hereinafter, although a case where the number of filter taps of the FIR filter is five is explained, the number of the filter taps is not limited to five. When an input signal is "x", a filter coefficient is "$a_m$", and an output signal is "y", a difference equation of the filter can be expressed as follows:

$$y[n]=(a_0 x[n-2]+a_1 x[n-1]+a_2 x[n]+a_3 x[n+1]+a_4 x[n+2])$$

Note that, among the five input signals, x[n−2] is the oldest signal and x[n+2] is the latest signal.

The FIR filter is applied to the series of reception data, therefore, the respective input signals x indicate the respective amplitude values of the reception data included in the series of reception data. This algorithm is a kind of adaptive filtering and has a characteristic of changing the filter coefficient of each filter tap based on a relation in levels of the amplitude values among the five reception data used in the calculation of the filtering (x[n−2] to x[n+2]).

Hereinafter, a method of determining the filter coefficient is explained. In this radar signal processing algorithm, a change tendency (one of an increase tendency, a decrease tendency, or neither an increase tendency nor decrease tendency) of the amplitude values of the five reception data used in the calculation of the filtering (x[n−2] to x[n+2]) is determined, and the filter coefficient is determined based on the determination result.

First, in the radar signal processing algorithm, a determination of whether the amplitude values of the five reception data used in the calculation of the filtering (x[n−2] to x[n+2]) satisfy the following condition 1 is performed.

Condition 1: Among the amplitude values of the five reception data used in the calculation of the filtering (x[n−2] to x[n+2]), the amplitude value x[n] of the reception data at the central filter tap indicates the minimum value.

Figure 2:
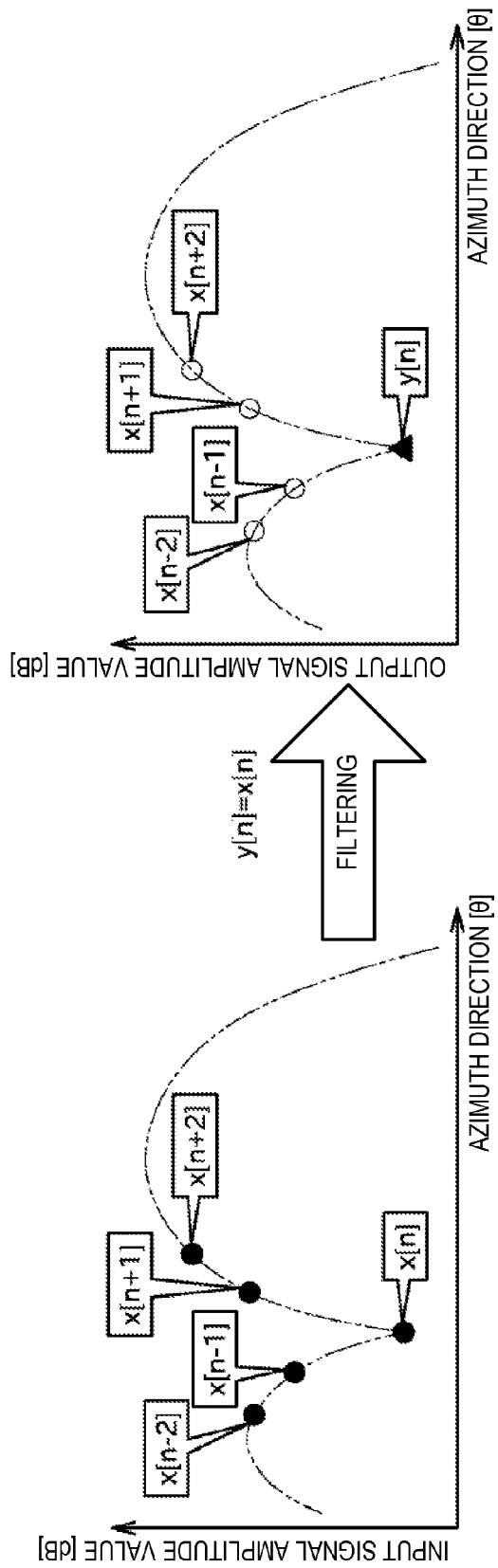
FIG. 2 is charts explaining the filtering in a case where reception data at a central filter tap indicates a minimum value.

For example, in the case where the filtering is performed on the five reception data as shown in FIG. 2, condition 1 is satisfied. Note that, in this case where the amplitude value x[n] of the reception data at the central filter tap indicates the minimum value, it may be considered that the amplitude values of the five reception data used in the calculation of the filtering (x[n−2] to x[n+2]) have neither the increase tendency nor the decrease tendency as a whole, i.e., over the entire set of five reception data.

In the case where condition 1 is satisfied (the reception data has neither the increase tendency nor the decrease tendency), in the radar signal processing algorithm, the filter coefficient is determined so that the amplitude value x[n] of the reception data at the central filter tap is outputted as an output signal y[n] as it is. Specifically, in the case where condition 1 is satisfied, the filter coefficient is set as $a_0=0$, $a_1=0$, $a_2=1$, $a_3=0$ and $a_4=0$. In this case, the output signal y[n] becomes y[n]=x[n].

In the case where condition 1 is not satisfied, in the radar signal processing algorithm, a determination of whether the amplitude values of the five reception data used in the calculation of the filtering (x[n−2] to x[n+2]) satisfy the following condition 2 is performed.

Condition 2: Condition 1 is not satisfied, among the amplitude values of the five reception data used in the calculation of the filtering (x[n−2] to x[n+2]), the amplitude value of the latest reception data (x[n+2]) indicates the maximum value, and x[n+1]≥x[n].

Figure 3:
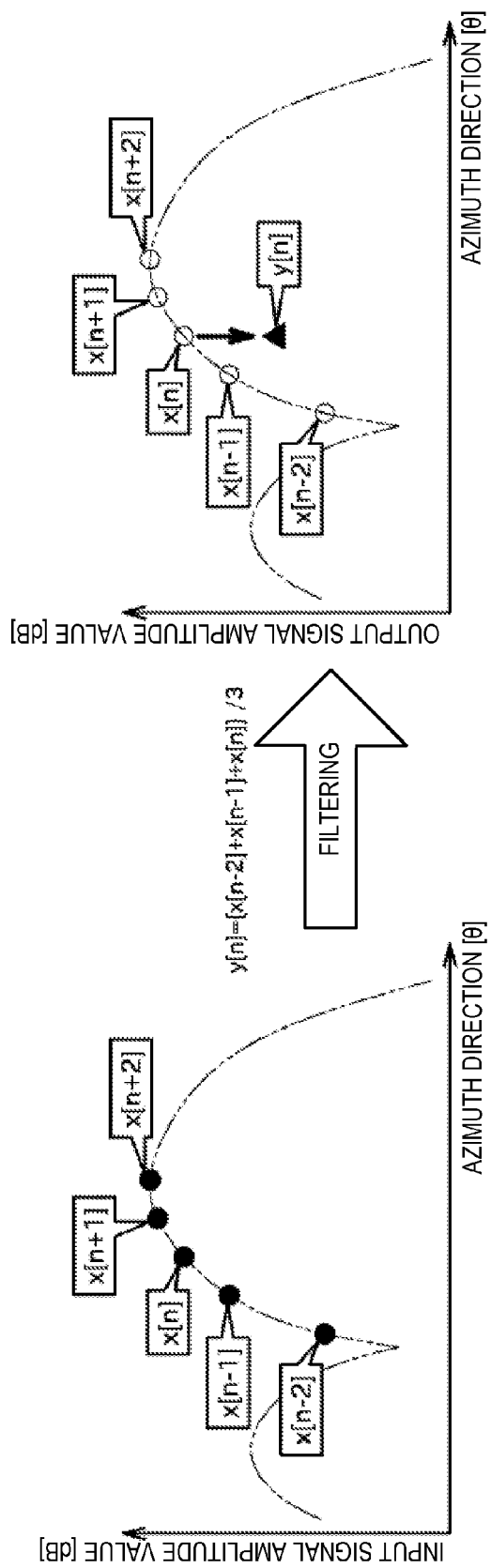
FIG. 3 is charts explaining the filtering in a case where the reception data shows an increase tendency.

For example, in the case where the filtering is performed on the five reception data as shown in FIG. 3, condition 2 is satisfied. Note that, in the case where condition 2 is satisfied, x[n] is not the minimum value, therefore, either one of $$x[n-1] \le x[n] \le x[n+1] \le x[n+2] \text{ and } x[n-2] \le x[n] \le x[n+1] \le x[n+2]$$

is satisfied. In this manner, in the case where condition 2 is satisfied, it may be considered that the amplitude values of the five reception data used in the calculation of the filtering (x[n−2] to x[n+2]) have the increase tendency as a whole, i.e., over the entire set of five reception data.

In the case where condition 2 is satisfied as above (the reception data is determined to have the increase tendency), in this radar signal processing algorithm, the filter coefficient is determined so that a moving average between the amplitude value x[n] of the reception data at the central filter tap and the amplitude values of the preceding reception data (x[n−1] and x[n−2]) is outputted as the output signal y[n] (moving average filtering). Specifically, in the case where condition 2 is satisfied, the filter coefficient is set as $a_0=\frac{1}{3}$, $a_1=\frac{1}{3}$, $a_2=\frac{1}{3}$, $a_3=0$ and $a_4=0$. In this case, the output signal y[n] of the filter becomes y[n]={x[n−2]+x[n−1]+x[n]}/3.

In a case where both conditions 1 and 2 are not satisfied, in this radar signal processing algorithm, a determination of whether the amplitude values of the five reception data used in the calculation of the filtering (x[n−2] to x[n+2]) satisfy the following condition 3 is performed.

Condition 3: Conditions 1 and 2 are not satisfied, among the amplitude values of the five reception data used in the calculation of the filtering (x[n−2] to x[n+2]), the amplitude value of the oldest reception data (x[n−2]) indicates the maximum value, and x[n−1]≥x[n].

Figure 4:
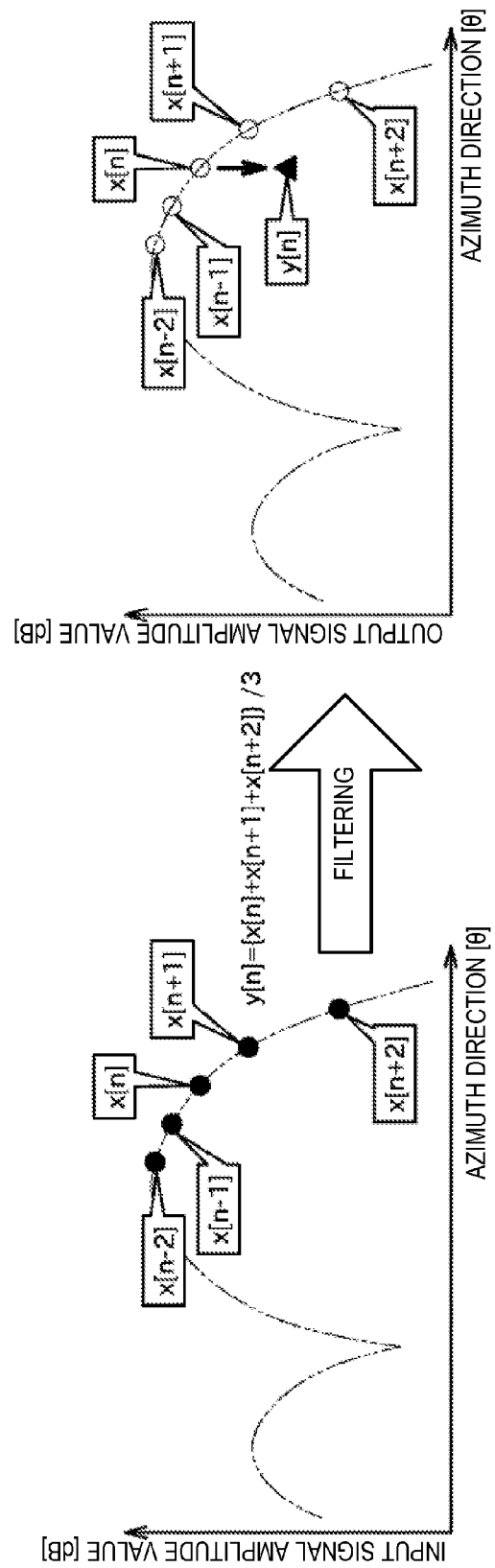
FIG. 4 is charts explaining the filtering in a case where the reception data shows a decrease tendency.

For example, in the case where the filtering is performed on the five reception data as shown in FIG. 4, condition 3 is satisfied. Note that, in the case where condition 3 is satisfied, x[n] is not the minimum value, therefore, either one of $$x[n-2] \geq x[n-1] \geq x[n] \geq x[n+1] \text{ and } x[n-2] \geq x[n-1] \geq x[n] \geq x[n+2]$$

is satisfied. In this manner, in the case where condition 3 is satisfied, it may be considered that the amplitude values of the five reception data used in the calculation of the filtering (x[n−2] to x[n+2]) have the decrease tendency as a whole, i.e., over the entire set of five reception data.

In the case where condition 3 is satisfied as above (the reception data is determined to have the decrease tendency), in this radar signal processing algorithm, the filter coefficient is determined so that a moving average between the amplitude value x[n] of the reception data at the central filter tap and the amplitude values of the newer reception data (x[n+1] and x[n+2]) is outputted as the output signal y[n]. Specifically, in the case where condition 3 is satisfied, the filter coefficient is set as $a_0=0$, $a_1=0$, $a_2=\frac{1}{3}$, $a_3=\frac{1}{3}$ and $a_4=\frac{1}{3}$. In this case, the output signal y[n] of the filter becomes y[n]={x[n]+x[n+1]+x[n+2]}/3.

Figure 5:
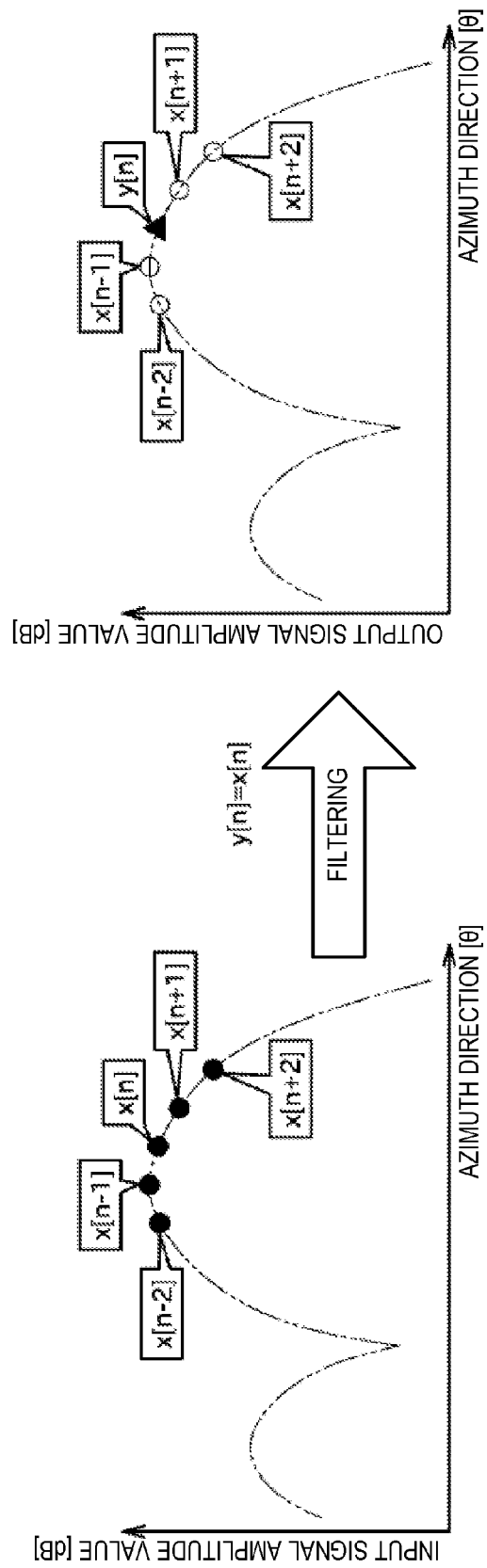
FIG. 5 is charts explaining the filtering in a case where the reception data shows neither the increase tendency nor the decrease tendency.

In a case where any of conditions 1 to 3 is not satisfied (e.g., the case as shown in FIG. 5), it may be considered that the amplitude values of the five reception data used in the calculation of the filtering (x[n−2] to x[n+2]) have neither the increase tendency nor the decrease tendency across the entire set of five reception data. In this case, in the radar signal processing algorithm, similar to the case where condition 1 is satisfied, the filter coefficient is determined so that the amplitude value x[n] of the reception data at the central filter tap is outputted as the output signal y[n] as it is, i.e., without modification. Specifically, in the case where none of conditions 1 to 3 are satisfied, the filter coefficient is set as $a_0=0$, $a_1=0$, $a_2=1$, $a_3=0$ and $a_4=0$. In this case, the output signal y[n] becomes y[n], x[n].

In summary, in the radar signal processing algorithm, a kind of moving average filtering is performed in the case where the series of reception data is determined to have either one of the increase tendency and the decrease tendency, and the amplitude value x[n] of the reception data at the central filter tap is outputted, as it is in the other case.

Here, as described above, when the series of reception data is determined to have the increase tendency (when condition 2 is satisfied), the moving average filtering using the amplitude value x[n] of the reception data at the central filter tap and the amplitude values of the reception data older than the reception data at the central filter tap, (x[n−2] and x[n−1]) is performed. In this manner, the moving average obtained by using the data older than that at the central filter tap is outputted, therefore, in the case where condition 2 is satisfied, the output signal y[n] of the filter is a signal indicating the amplitude value delayed from the amplitude value x[n] of the reception data at the central filter tap. Because the output signal y[n] is delayed with respect to the input signal with the increase tendency, as shown in the right chart of FIG. 3, the output signal y[n] is easily positioned below the data (inside the peak curve) of the series of reception data that are the input signals.

Further, as described above, when the series of reception data is determined to have the decrease tendency (when condition 3 is satisfied), the moving average filtering using the amplitude value x[n] of the reception data at the central filter tap and the amplitude values of the reception data newer than the reception data at the central filter tap (x[n+2] and x[n+1]) is performed. In this manner, the moving average obtained by using the data newer than that at the central filter tap is outputted, therefore, in the case where condition 3 is satisfied, the output signal y[n] of the filter is a signal indicating the amplitude value preceding the amplitude value x[n] of the reception data at the central filter tap. Because the output signal y[n] precedes the input signal with the decrease tendency, as shown in the right chart of FIG. 4, the output signal y[n] is easily positioned below the data (inside the peak curve) of the series of reception data that are the input signals.

As above, with the radar signal processing algorithm of this embodiment, the output signal y[n] positioned inside the peak curve of the input signals (series of reception data) can be obtained. As a result, as shown in FIG. 1, the width of the peak area can be narrowed compared to the original signals. In this manner, the echo image displayed in the radar image can be reduced in size, and as a result, the echo images of the plurality of adjacent target objects being superimposed with each other and recognized as one can be prevented. That is, by performing the filtering on the series of reception data of the radar apparatus based on the radar signal processing algorithm, the resolution of the radar apparatus can be improved.

Moreover, in the radar signal processing algorithm, in the case where the input signals (the series of reception data) are determined to have neither the increase tendency nor the decrease tendency, the original input signal serves as the output signal as it is, i.e., without modification. Therefore, the maximum and minimum values of the input signals to the filter are outputted as they are. That is, the output signal reduced in the width of the peak area can be obtained while keeping the maximum value (at the peak) and the minimum value in the chart of the series of reception data. Therefore, excluding the necessary echo image and displaying the unnecessary echo image (e.g., noise) can be prevented.

Figure 6:
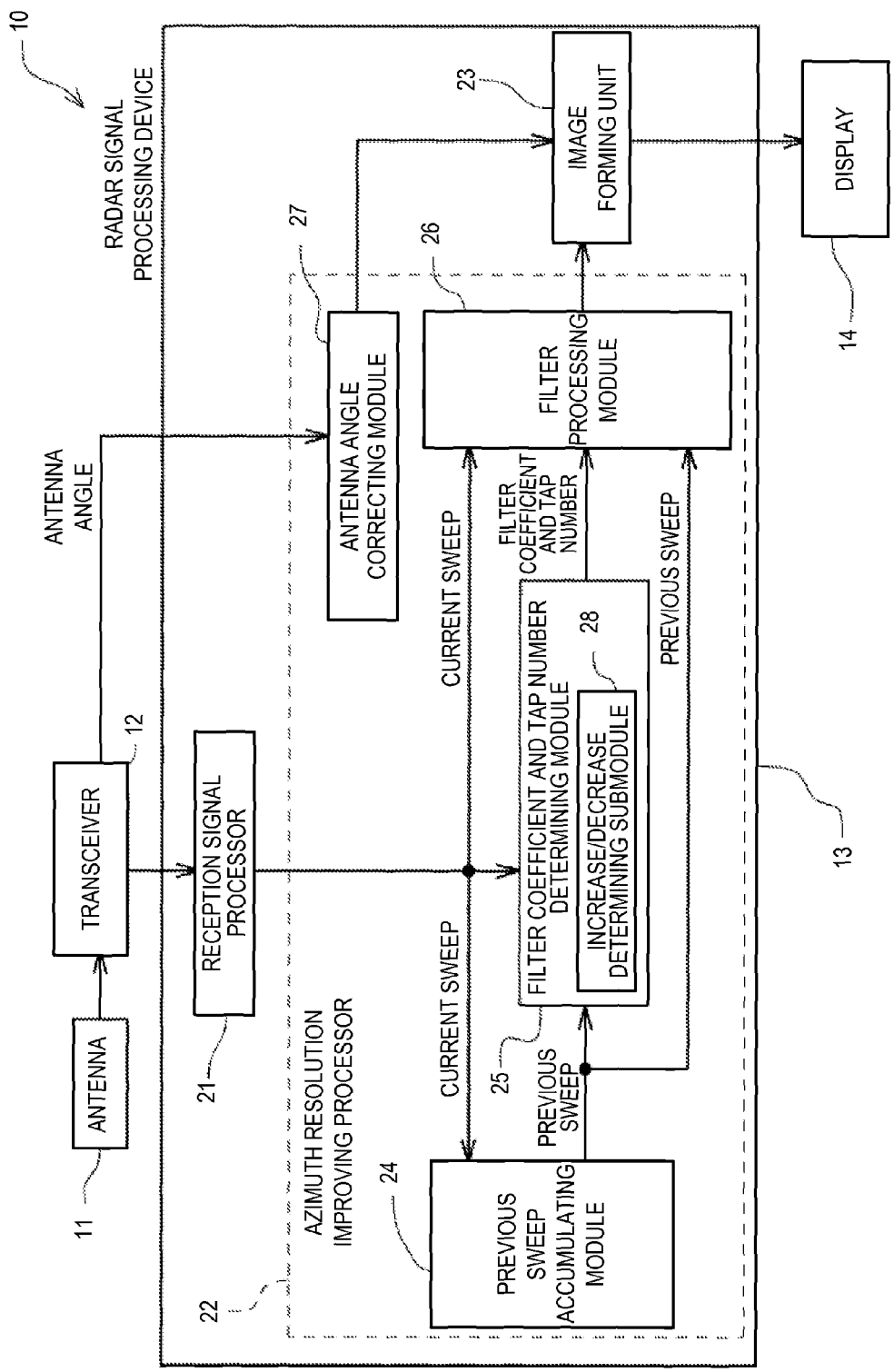
FIG. 6 is a block diagram showing a configuration of a radar apparatus according to the embodiment of the present invention.

Next, a radar apparatus according to this embodiment is explained. The radar apparatus 10 is configured as a radar apparatus for a ship. As shown in FIG. 6, the radar apparatus 10 includes an antenna 11, a transceiver 12, a radar signal processing device 13, and a display 14.

The antenna 11 has a well known configuration for transceiving a radio wave while rotating at a predetermined angular velocity.

Figure 7:
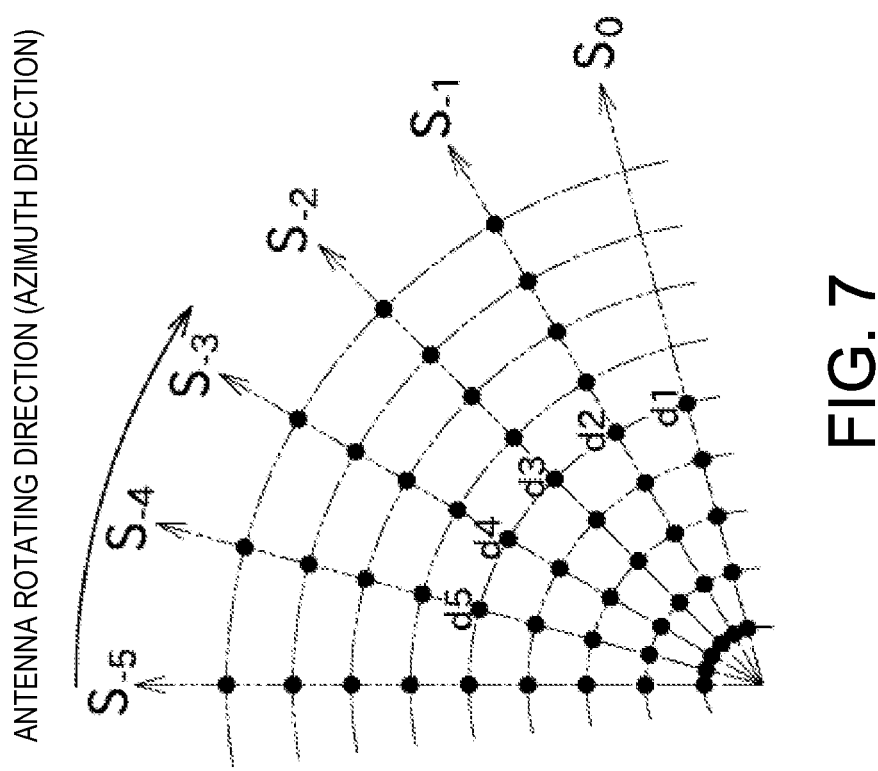
FIG. 7 is a view explaining how a series of reception data is acquired by the radar apparatus.

The transceiver 12 repeatedly transmits a pulsed radio wave from the antenna 11, detects an echo signal received by the antenna 11, and converts it into digital reception data by sampling. The operation of receiving the echo signal while transmitting the pulsed radio wave is referred to as a sweep. In one sweep, a series of reception data formed by a plurality of reception data continuous in a distance direction is acquired. The form of the acquisition is schematically shown in FIG. 7. In the example of FIG. 7, $S_0$ indicates a latest sweep and $S_{-1}$, $S_{-2}$, ... indicate previous sweeps.

The reception data sampled by the transceiver 12 is sequentially outputted to the radar signal processing device 13.

Meanwhile, as described above, in a low priced compact radar, there has been a problem that the resolution in the azimuth direction is low. Thus, by applying the filtering processing using the radar signal processing algorithm on the series of reception data formed by the reception data continuous in the azimuth direction (the series of reception data of the azimuth direction), the radar signal processing device 13 of this embodiment improves the resolution in the azimuth direction.

The radar signal processing device 13 is configured as a computer including hardware such as a CPU or other processor, non-volatile memory such as Read Only Memory (ROM) and volatile memory such as random access memory (RAM) (not illustrated), and software, such as the radar signal processing program stored in the ROM. Further, by the cooperation of the hardware and the software, the radar signal processing device 13 may function as, for example, a reception signal processor 21, an azimuth resolution improving processor 22, and an image forming unit 23. Computer readable media may be provided for storing in a non-transitory manner the computer executable programs described herein, which upon execution by a processor of a computer causes the computer to process a radar signal according to the methods described herein. These computer readable media may include CDs, DVDs, ROMs, EEPROMs, FLASH memory devices, or other removable storage devices configured to store program data in a non-volatile manner. The radar signal processing device 13 may be configured to read a program from such computer readable media and execute the program via a processor using portions of volatile memory, as described above.

The reception signal processor 21 performs signal processing, such as noise removal and interference removal, on the reception data inputted from the transceiver 12.

By applying the filtering using the radar signal processing algorithm of this embodiment to the series of reception data in the azimuth direction, the azimuth resolution improving processor 22 improves the resolution in the azimuth direction.

The image forming unit 23 forms the radar image based on the output result from the azimuth resolution improving processor 22 and outputs to the display 14.

Next, the specific processing of the azimuth resolution improving processor 22 is explained.

The azimuth resolution improving processor 22 includes a previous sweep accumulating module 24, a filter coefficient and filter tap number determining module 25 (filter coefficient changer), a filter processing module 26 (filter processor), and an antenna angle correcting module 27.

The previous sweep accumulating module 24 is accumulated with the reception data for a few previous sweeps.

Once the filter processing module 26 (filter processing module) acquires the latest reception data from the reception signal processor 21, it performs the filtering using, as a processing target, the series of reception data formed by the reception data continuous to the latest reception data in the azimuth direction. For example, as shown in FIG. 7, when the latest reception data $d_1$ is obtained in the latest sweep $S_0$, the series of reception data formed by the plurality of reception data continuous in the azimuth direction that includes the latest reception data $d_1$ becomes the processing target of the filter processing module 26.

Note that, in this embodiment, the number of the filter taps in the filtering is set to five, therefore, the amplitude values of the five reception data ($d_1$, $d_2$, $d_3$, $d_4$ and $d_5$) continuous in the azimuth direction that includes the latest reception data serves as the input signal to the filter. The filter processing module 26 acquires the four previous data ($d_2$, $d_3$, $d_4$ and $d_5$) continuous to the latest reception data $d_1$ in the azimuth direction from the previous sweep accumulating module 24. In this case, in the difference equation for the FIR filter, the following is satisfied:

$$x[n+2]=d_1, x[n+1]=d_2, x[n]=d_3, x[n-1]=d_4, \text{ and } x[n-2]=d_5.$$

The filter coefficient and filter tap number determining module 25 acquires five reception data used in the calculation of the filtering by the filter processing module 26 (in the case above, the reception data $d_1$, $d_2$, $d_3$, $d_4$ and $d_5$) and determines the filter coefficient based on the relation in levels of the amplitude values among the reception data. More specifically, the filter coefficient and filter tap number determining module 25 has an increase/decrease determining submodule 28 for determining whether the amplitude values of the five reception data have, as a whole, the increase tendency, the decrease tendency, or neither of them. This determination processing is performed as described in the radar signal processing algorithm explanation, and therefore, the description thereof is omitted.

The filter coefficient and filter tap number determining module 25 determines the filter coefficient based on the determination result, and outputs the filter coefficient to the filter processing module 26. Note that, the detail of the method of determining the filter coefficient based on the determination result is as described in the radar signal processing algorithm explanation above, and therefore, the description thereof is omitted.

The filter processing module 26 performs the filtering by using the filter coefficient determined by the filter coefficient and filter tap number determining module 25. Note that, the detail of the filtering is as described in the radar signal processing algorithm explanation above, and therefore, the description thereof is omitted. By the processing above, the output signal that narrows the peak area width of the data of the series of reception data in the azimuth direction is obtained, and therefore, the resolution in the azimuth direction can be improved.

Meanwhile, in the case where the amplitude values of the five reception data (in the case of FIG. 7, the reception data $d_1$, $d_2$, $d_3$, $d_4$ and $d_5$) have neither the increase tendency nor the decrease tendency, the filter processing module 26 outputs the amplitude value of the reception data at the central filter tap (in the case of FIG. 7, the reception data $d_3$) as it is, i.e., without modification. The reception data at the central filter tap is delayed with respect to the latest reception data (in the case of FIG. 7, the reception data $d_1$) by two sweeps. Therefore, in this case, a radar image shifted in the azimuth direction by two sweeps is formed by the image forming unit 23. Therefore, in this embodiment, an antenna angle corrected to be delayed by two sweeps through the antenna angle correcting module 27 is outputted to the image forming module 23. The image forming module 23 forms the radar image using the antenna angle corrected as above and the output signal from the filter processing module 26. In this manner, the image forming module 23 can form the radar image corrected for the delay of the filtering.

Note that, in the radar apparatus 10, a horizontal beam width differs based on the kind of the antenna used therein, therefore the azimuth resolution also differs based on the kind of the antenna. Therefore, preferably, the effect of the filter is adjusted according to the differences in horizontal beam width. Further, even with the same kind of antenna, an angle change in the azimuth direction for each sweep differs based on a sweep interval (a transmission cycle of the transmission pulsed radio wave), and as a result, the effect of the filtering in the radar image changes. Therefore, preferably, the effect of the filter is adjusted according to the usage conditions such as the horizontal beam width and the sweep interval.

Thus, in this embodiment, the filter coefficient and filter tap number determining module 25 determines the number of the filter taps according to the usage conditions of the radar apparatus 10 and outputs it to the filter processing module 26. Because the range of the reception data to be used in obtaining the moving average changes by changing the number of the filter taps of the filter, the effect of the filter can be adjusted. The filter processing module 26 performs the filtering with the number of the filter taps determined by the filter coefficient and filter tap number determining module 25.

For example, preferably, the effect of the filtering increases (the effect of narrowing the peak area increases) as the beam width becomes wider because the azimuth resolution degrades as the beam width widens. Therefore, the filter coefficient and filter tap number determining module 25 is configured to increase the number of the filter taps as the beam width becomes wider. That is, if the number of the filter taps is increased, the range of the reception data to be used in obtaining the moving average by the filtering enlarges, and therefore, the effect of the filtering further increases. In this embodiment, the number of the filter taps is an odd number and is set to five; however, it is not limited to this specific configuration.

Further, for example, the number of the reception data in the azimuth direction included in one angle unit increases as the sweep interval becomes shorter (as the transmission cycle of the transmission pulsed radio wave becomes shorter). Therefore, the filter coefficient and filter tap number determining module 25 is configured to increase the number of the filter taps as the sweep interval becomes shorter. In this manner, regardless of the sweep interval, the appearance of the echo image on the radar image can be kept visually consistent.

As described above, the radar signal processing device 13 of this embodiment includes the filter processing module 26 for performing the filtering on the series of reception data formed by the plurality of reception data. The filter processing module 26 performs the filtering while changing the filter coefficient based on the relation in levels of the amplitude values among the reception data used in the calculation of the filtering.

Further, the radar signal processing program of this embodiment uses the radar signal processing device 13 to function as the filter processor 26 for performing the filtering on the series of reception data formed by the plurality of reception data.

By changing the filter coefficient according to the relation in levels of the amplitude values in the series of reception data, the processing in which the filter coefficient is changed between an area where the amplitude value increases or decreases and other areas (e.g., the area indicating the maximum value of the series of reception data). In this manner, the shape of the echo obtained from the reception data can be reshaped as desired, and therefore, the visibility of the echo image in the radar image can be improved. Further, because a complex system is not required, and position and azimuth information obtained from a GPS or a gyrocompass is also not required, the radar signal processing device 13 can be configured easily at a low cost.

Further, the radar signal processing device 13 of this embodiment includes the filter coefficient and filter tap number determining module 25. The filter coefficient and filter tap number determining module 25 determines the filter coefficient based on the change tendency of the amplitude values of the reception data used in the calculation of the filtering. The filter processing module 26 performs the filtering on the series of reception data which is the processing target by using the filter coefficient determined by the filter coefficient and filter tap number determining module 25.

Thus, by changing the filter coefficient based on the change tendency of the amplitude values of the reception data included in the series of reception data which is the processing target, for example, the effect of the filter can be changed for the respective cases where the series of reception data has the increase tendency, the decrease tendency, and neither of them (e.g., the amplitude value of the reception data indicates the maximum/minimum value of the series of reception data).

Further, the radar signal processing device 13 of this embodiment is configured as follows. That is, in the case where the amplitude values of the reception data used in the calculation of the filtering have neither the increase tendency nor the decrease tendency, the filter coefficient and filter tap number determining module 25 determines the filter coefficient so that the filter processing module 26 outputs the amplitude value of the reception data inputted at the central filter tap in the filter processing module 26.

In this manner, the maximum and minimum values of the series of reception data can be prevented from being changed before and after the filtering. Therefore, when the echo obtained from the reception data is displayed in the radar image, the echo image that should be displayed being excluded due to the filtering and the echo image that should not be displayed appearing due to the filtering can be prevented.

Further, the radar signal processing device 13 of this embodiment is configured as follows. In the case where the amplitude values of the reception data used in the calculation of the filtering have the increase tendency, the filter coefficient and filter tap number determining module 25 determines the filter coefficient so that the filter processing module 26 outputs the moving average based on the reception data older than the reception data at the central filter tap in the filter processing module 26. In the case where the amplitude values of the reception data used in the calculation of the filtering have the decrease tendency, the filter coefficient and filter tap number determining module 25 determines the filter coefficient so that the filter processing module 26 outputs the moving average based on the reception data newer than the reception data at the central filter tap.

In this manner, the shape of the echo obtained from the reception data can be formed more precisely by the filtering. Thus, the echo images of the plurality of adjacent objects are suppressed from being superimposed with each other and the identifiability of the echo image improves.

Further, in the radar signal processing device 13 of this embodiment, the series of reception data to be inputted to the filter processing module 26 is formed by the reception data continuous in the azimuth direction.

Thus, the shape of the echo obtained from the reception data can suitably be adjusted in the azimuth direction by performing the filtering on the reception data continuous in the azimuth direction. Therefore, the resolution in the azimuth direction can be improved.

Moreover, the radar signal processing device 13 of this embodiment includes the filter coefficient and filter tap number determining module 25 for determining the number of the filter taps in the filter processing module 26 based on the usage conditions of the radar apparatus 10.

Thus, the number of the filter taps is changed based on the usage conditions. In this manner, even in the case where the usage condition is changed, the effect of the filtering can be kept consistent.

Further, the radar apparatus 10 of this embodiment includes the radar signal processing device 13, the antenna 11, and the display 14. The display 14 displays the radar image based on the reception data filter-processed by the filter processing module 26 of the radar signal processing device 13.

According to the radar apparatus 10, the radar image can be displayed based on the series of reception data in which the shape of the peak area is adjusted by the filter processing module 26. Therefore, the visibility of the radar image can be improved.

Figure 8:
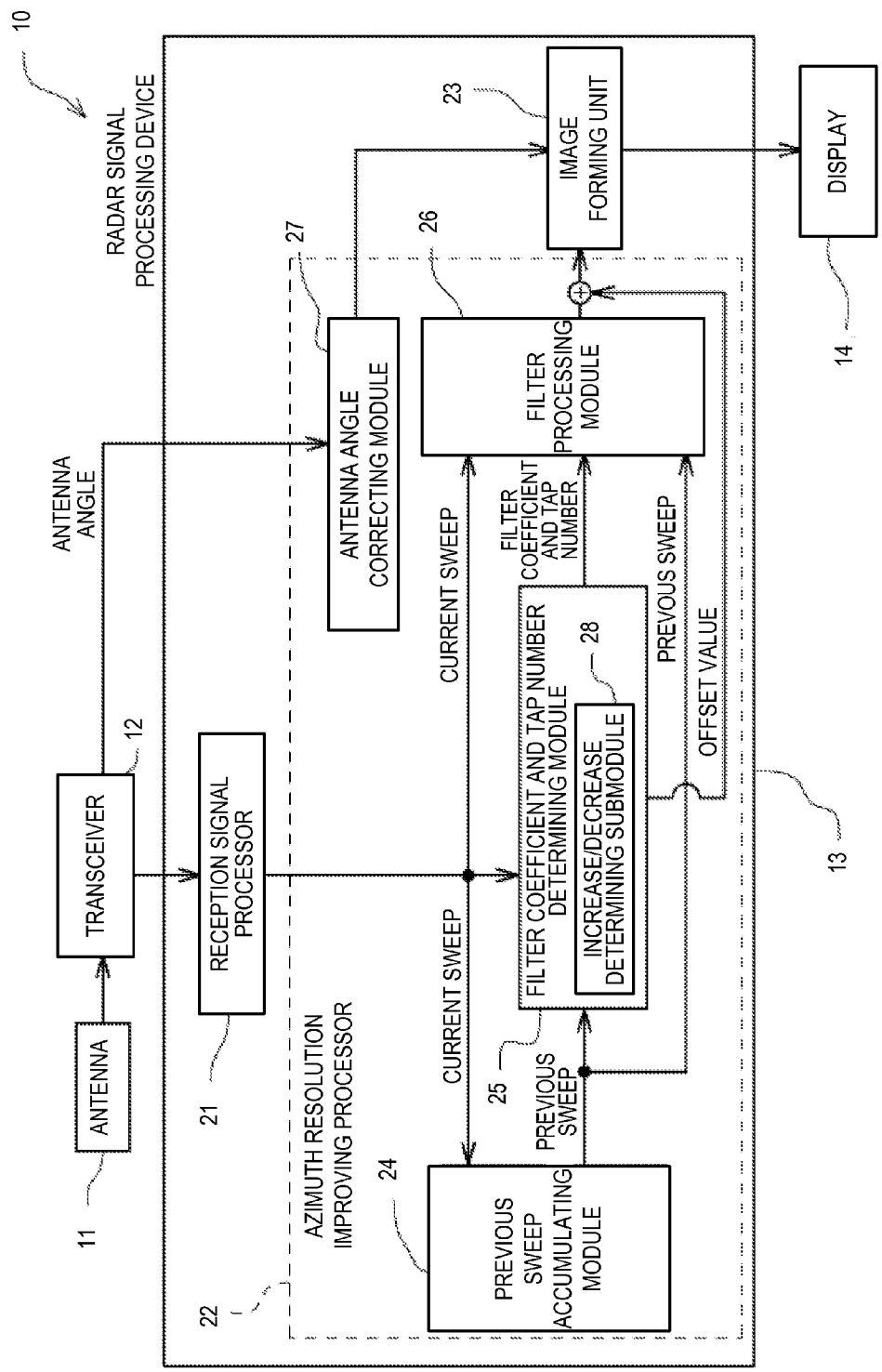
FIG. 8 is a block diagram showing a configuration of a radar apparatus according to a modified example.

Next, a modified example of this embodiment is explained. As shown in FIG. 8, in this modified example, the radar apparatus is configured so that an offset value is added to the output signal of the filter processing module 26. The offset value is determined by the filter coefficient and filter tap number determining module 25 based on the relation in levels of the reception data used in the calculation of the filtering by the filter processing module 26.

For example, in the case where the reception data has either one of the increase tendency and the decrease tendency, by setting the offset value to be a negative value, the value of the output signal from the filter processing module 26 can further be reduced to be outputted to the image forming module 23. In this manner, the width of the peak area of the signal can be narrowed even more, and therefore, the azimuth resolution can further be improved. Further, in the case where the reception data has neither the increase tendency nor the decrease tendency, the offset value is set to zero. Thus, the maximum value (at the peak) and the minimum value of the series of reception data can be prevented from being changed.

Next, another modified example of this embodiment is explained. On the display 14 of the radar apparatus 10, an echo image of a target object close to the antenna 11 tends to be displayed small in size, and an echo image of a target object far therefrom tends to be displayed large in size. Therefore, processing of enlarging the echo image of the close target object may be performed to adjust the sizes of the echo images of the close and far target objects to be similar in size visually.

The radar signal processing algorithm of this embodiment can be used in the above processing of enlarging the echo image. That is, by switching the processing for the case where condition 2 is satisfied and the case where condition 3 is satisfied with each other, an output signal that widens the peak area width can be obtained.

More specifically, when condition 2 is satisfied (when the reception data is determined to have the increase tendency), the filter coefficient is determined for the moving average to be calculated by using the reception data newer than the reception data at the central filter tap. On the other hand, when condition 3 is satisfied (when the reception data is determined to have the decrease tendency), the filter coefficient is determined for the moving average to be calculated by using the reception data older than the reception data at the central filter tap. In this manner, the output signal y[n] of the filter is easily positioned above the data (outside the peak area) of the series of reception data that are the original input signals. Therefore, the output signal widens the peak area width. Thus, the radar signal processing algorithm of this embodiment can be applied to the processing for widening the peak area width by suitably selecting the filter coefficient.

Further, by performing, only on the reception data corresponding to an echo from a closely positioned target object from the antenna 11, the processing for widening the peak area, the echo image of the close target object can be displayed in an enlarged manner. In this manner, the sizes of the echo image of the target object close to the antenna 11 and the echo image of the target object far therefrom can be uniformed. Therefore, the visibility of the echo images in the radar image improves. Thus, the contents of the filtering by the filter processing module 26 can be changed according to the distance from the antenna 11 to the target object.

Note that, the size of the target object in the radar image differs not only by the distance from the antenna 11 but also by a transmission output power of the transmission pulsed radio wave. Therefore, the filter coefficient can be changed according to the transmission output power.

As described above, the radar signal processing device 13 may be configured as follows. That is, in the case where the amplitude values of the reception data used in the calculation of the filtering have the decrease tendency, the filter coefficient and filter tap number determining module 25 determines the filter coefficient so that the filter processing module 26 outputs the moving average based on the reception data older than the reception data at the central filter tap in the filter processing module 26. In the case where the amplitude values of the reception data used in the calculation of the filtering have the increase tendency, the filter coefficient and filter tap number determining module 25 determines the filter coefficient so that the filter processing module 26 outputs the moving average based on the reception data newer than the reception data at the central filter tap.

In this manner, the shape of the echo obtained from the reception data can be enlarged by the filtering.

Further, as described above, the filter processing module 26 may be configured to change the contents of the filtering according to the distance from the radar apparatus to the target object corresponding to the reception data.

In this manner, the shape of the echo obtained from the reception data can suitably be adjusted according to the distance.

Next, another modified example of this embodiment is explained. In the above examples, the filtering is performed on the reception data continuous in the azimuth direction; however, the filtering may be performed on the reception data continuous in the distance direction for the case where the resolution in the distance direction is desired to be improved.

Thus, the series of reception data to be inputted to the filter processing module 26 may be formed by the reception data continuous in the distance direction. Because the shape of the echo obtained from the reception data can suitably be adjusted in the distance direction by performing the filtering on the reception data continuous in the distance direction, for example, the resolution in the distance direction can be improved.

Although, as above, the preferred embodiment of the invention and the modified examples thereof are explained, the above configurations may further be modified as follows.

The radar apparatus 10 is not limited to the radar apparatus for a ship and may be applied to other kinds of radar apparatuses.

The radar signal processing device 13 is explained above to be constituted from the hardware and the software; however, a part of or the entire functions of the radar signal processing device 13 may be achieved by dedicated hardware.

The modified example in which the offset value is added to the output signal of the filter processing module 26 is explained above; however, the FIR filtering by the filter processing module 26 may be omitted and the offset value may be added directly to the reception data that the reception signal processing module 21 outputs. In this case, the processing itself, in which the offset value is added, may be considered as the filtering in the above embodiment. The offset value is determined based on the relation in levels of the amplitude values of the reception data, and therefore, the offset value may be considered as the filter coefficient in the above embodiment.

The method of determining the increase and/or the decrease of the amplitudes of the reception data is merely an example and is not limited to this. As long as the part where the value may be changed by the filtering (the part where the amplitude value increases or decreases) and the part where the value should not be changed (the maximum value which is at the peak and the minimum value of the series of reception data) are discriminated from each other, a suitable determination method other than the above may be used.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radar apparatus comprising:
   an antenna for receiving reception data;
   a radar signal processing device, including:
      an azimuth resolution improving processor including:
         an amplitude value change determiner for determining, among amplitude values of a series of the reception data, an increase/decrease tendency of a predetermined number of amplitude values of the reception data; and
         a filter processor for filtering the reception data based on a determination result of the amplitude value change determiner; and
   a display for displaying a radar image based on the filtered reception data.

2. The radar apparatus of claim 1, further comprising a filter coefficient changer for determining a filter coefficient based on the determination result of the amplitude value change determiner,
   wherein the filter processor filters the reception data by using the determined filter coefficient.

3. The radar apparatus of claim 2, wherein when the predetermined number of amplitude values do not indicate the increase/decrease tendency, the filter coefficient changer determines the filter coefficient so that the filter processor outputs the amplitude value of the reception data inputted at a central filter tap of an odd number of three or more filter taps of the filter processor, the number of the filter taps corresponding to the predetermined number.

4. The radar apparatus of claim 2, wherein when the predetermined number of amplitude values indicate an increase tendency, the filter coefficient changer determines the filter coefficient so that the filter processor outputs a moving average based on reception data preceding the reception data corresponding to a central filter tap of an odd number of three or more filter taps of the filter processor, and
   wherein when the predetermined number of amplitude values indicate a decrease tendency, the filter coefficient changer determines the filter coefficient so that the filter processor outputs the moving average based on reception data following the reception data corresponding to the central filter tap.

5. The radar apparatus of claim 2, wherein when the predetermined number of amplitude values indicate a decrease tendency, the filter coefficient changer determines the filter coefficient so that the filter processor outputs a moving average based on reception data preceding the reception data corresponding to a central filter tap of an odd number of three or more filter taps of the filter processor, and
   wherein when the predetermined number of amplitude values indicate an increase tendency, the filter coefficient changer determines the filter coefficient so that the filter processor outputs the moving average based on reception data following the reception data corresponding to the central filter tap.

6. The radar apparatus of claim 1, wherein the series of reception data continues in an azimuth direction.

7. The radar apparatus of claim 6, wherein the filter processor changes the filter coefficient according to a distance from the device to a target object corresponding to the reception data.

8. The radar apparatus of claim 1, wherein the series of reception data continues in a distance direction.

9. The radar apparatus of claim 1, further comprising a filter tap number determiner for determining a number of filter taps of the filter processor based on a usage condition of the radar apparatus.

10. The radar apparatus of claim 1, where the radar signal processing device is a ship radar signal processing device.

11. The radar apparatus of claim 1, where the radar signal processing device is included in a radar apparatus having an antenna configured to rotate at a predetermined angular velocity while transceiving radio waves.

12. The radar apparatus of claim 11, where the radar apparatus includes a transceiver configured to perform a sweep where a pulsed radio wave from the antenna is repeatedly transmitted, an echo signal received by the antenna is detected, and the echo signal is converted into digital reception data by sampling.

13. The radar apparatus of claim 12, where the sweep forms a series of reception data continuous in a direction.

14. A method of processing a radar signal via a radar apparatus comprising:
   at a radar processing device included in the radar apparatus:
      determining, among amplitude values of a series of reception data, an increase/decrease tendency of a predetermined number of amplitude values of the reception data via an azimuth resolution improving processor included in the radar processing device; and
      filtering the reception data based on a determination result via the azimuth resolution improving processor.

15. A method of processing a radar signal via a radar apparatus, comprising:
   at a radar processing device included in the radar apparatus:
      receiving a series of reception data at an azimuth resolution improving processor from an antenna in the radar apparatus, the azimuth resolution improving processor included in the radar processing device;
      determining, among amplitude values of the series of reception data, an increase/decrease tendency of a predetermined number of amplitude values of the reception data via the azimuth resolution improving processor;
      filtering the reception data based on a determination result via the azimuth resolution improving processor; and
      outputting the filtered reception data to a display in the radar apparatus coupled to the azimuth resolution improving processor in the radar processing device.

16. The method of claim 15, further comprising determining a filter coefficient based on the determination result of the amplitude value change determiner via a filter coefficient changer;
wherein a filter processor filters the filtered reception data by using the determined filter coefficient.

17. The method of claim 16, further comprising when the predetermined number of amplitude values indicate neither an increase tendency nor a decrease tendency, at the filter coefficient changer, determining the filter coefficient so that the filter processor outputs the amplitude value of the reception data inputted at a central filter tap of an odd number of three or more filter taps of the filter processor, the number of the filter taps corresponding to the predetermined number.

18. The method of claim 16, further comprising when the predetermined number of amplitude values indicate an increase tendency, at the filter coefficient changer, determining the filter coefficient so that the filter processor outputs a moving average based on reception data preceding the reception data corresponding to a central filter tap of an odd number of three or more filter taps of the filter processor, and when the predetermined number of amplitude values indicate a decrease tendency, the filter coefficient changer determines the filter coefficient so that the filter processor outputs the moving average based on reception data following the reception data corresponding to the central filter tap.

19. The method of claim 16, wherein when the predetermined number of amplitude values indicate a decrease tendency, the filter coefficient changer determines the filter coefficient so that the filter processor outputs a moving average based on reception data preceding the reception data corresponding to a central filter tap of an odd number of three or more filter taps of the filter processor, and
wherein when the predetermined number of amplitude values indicate an increase tendency, the filter coefficient changer determines the filter coefficient so that the filter processor outputs the moving average based on reception data following the reception data corresponding to the central filter tap.

* * * * *